July 14, 1936.  H. L. JOHNSTON  2,047,476
FOOD HANDLING APPARATUS
Filed May 27, 1931  3 Sheets-Sheet 1

INVENTOR
Herbert L. Johnston
BY Maréchal & Noé
ATTORNEY

July 14, 1936.  H. L. JOHNSTON  2,047,476
FOOD HANDLING APPARATUS
Filed May 27, 1931  3 Sheets-Sheet 3
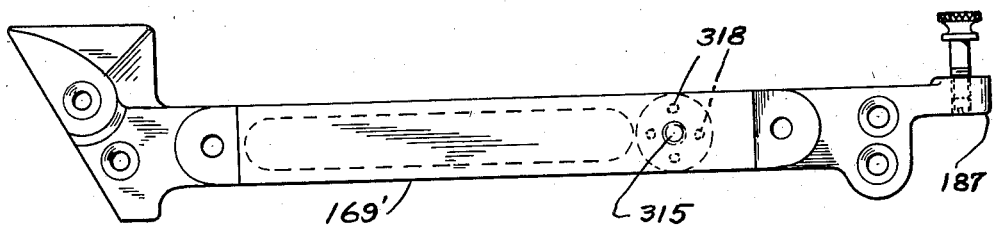
Fig.-5
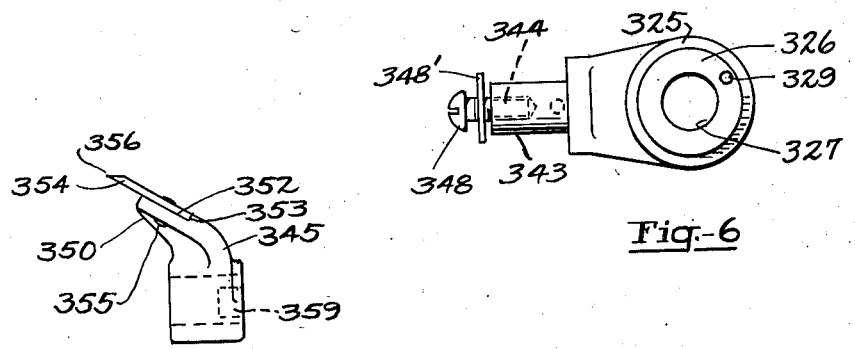
Fig.-8
Fig.-6
Fig.-7
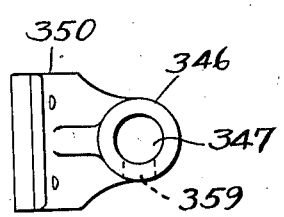
Fig.-9
INVENTOR
Herbert L. Johnston
BY Marechal & Noe
ATTORNEY Patented July 14, 1936

2,047,476

UNITED STATES PATENT OFFICE 2,047,476

FOOD HANDLING APPARATUS

Herbert L. Johnston, Troy, Ohio, assignor to The Hobart Manufacturing Company, Troy, Ohio, a corporation of Ohio Application May 27, 1931, Serial No. 540,281

11 Claims. (Cl. 146—102)

This invention relates to food handling apparatus, and more particularly to slicing machines.

One of the principal objects of the invention is to provide apparatus of this character which is simple in construction, is highly effective in operation, is sturdy and has long life, is sanitary and easily cleaned, and is safely and readily operated and controlled.

Another object of the invention is to provide apparatus of this character with highly effective knife scraping and cleaning means, which is simple in construction, substantially noiseless in operation, and which is adapted to adhere to the knife edge to give satisfactory scraping while conforming to any irregularities in the surface of the knife during rotation thereof.

Still another object of the invention is to provide a machine of this character with a simple and effective construction and mounting of the scraper mechanism in association with other parts of the machine so as to protect the mechanism from undue exposure while giving ready accessibility thereto, to provide a sanitary arrangement in which the particles removed by the scraper are properly accumulated for easy removal, and to provide at the same time supports for guards associated with the knife by means of the scraper mounting.

Other objects and advantages of the invention will be apparent from the following description, the accompanying drawings, and the appended claims.

This is a continuation in part of my copending application Serial No. 422,746, filed January 23, 1930 for Food handling apparatus and which became Patent No. 1,944,181 on January 23, 1934.

In the drawings, in which like characters of reference are used to denote like parts through the several views thereof—

Fig. 5 is a plan view of the supporting bracket of Fig. 4, detached from the other parts;

Fig. 6 is a plan view of the scraper arm of Fig. 4 detached from the other parts;

Fig. 7 is a side view of the scraper arm of Fig. 6;

Fig. 8 is a plan view of the scraper edge retainer and scraper blade of Fig. 4, these parts being detached from the remaining parts of the scraper mechanism; and Fig. 9 is a side view of the parts of Fig. 8.

Figure 1:
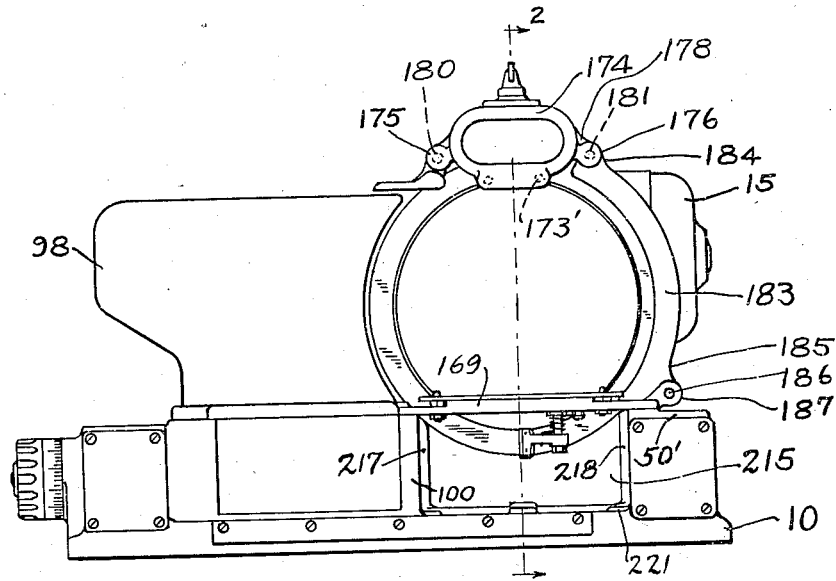
Fig. 1 is a side elevational view of apparatus constructed in accordance with this invention, the view being taken from the front side of the machine with the meat supporting carriage and related mechanism removed.
Figure 3:
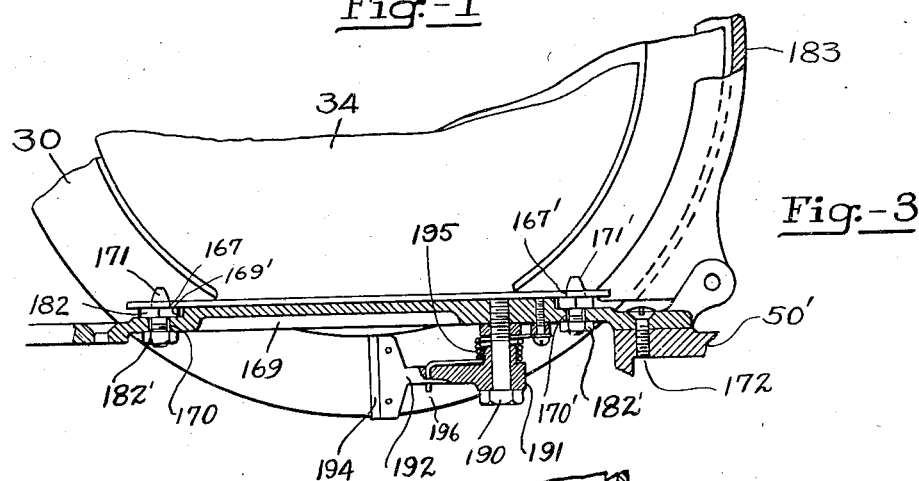
Fig. 3 is a detail vertical sectional view on an enlarged scale of the scraper mechanism, mounting therefor and related parts, the view being taken substantially on the plane of the line 3—3 of Fig. 2.
Figure 4:
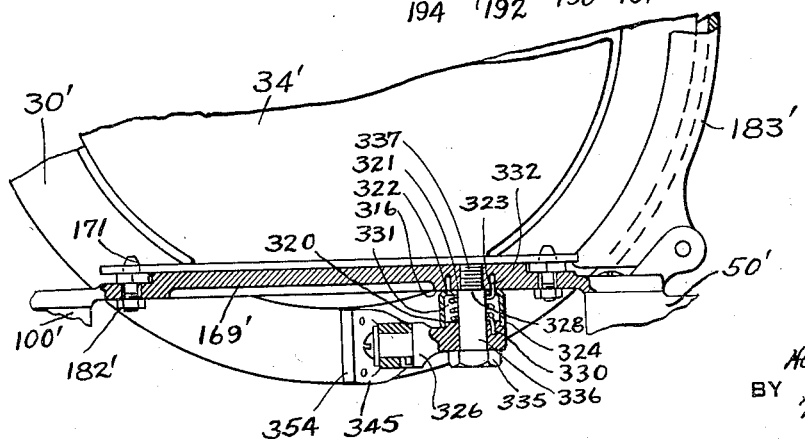
Fig. 4 is a view similar to Fig. 3 showing a somewhat modified form of scraper mechanism.
Figure 2:
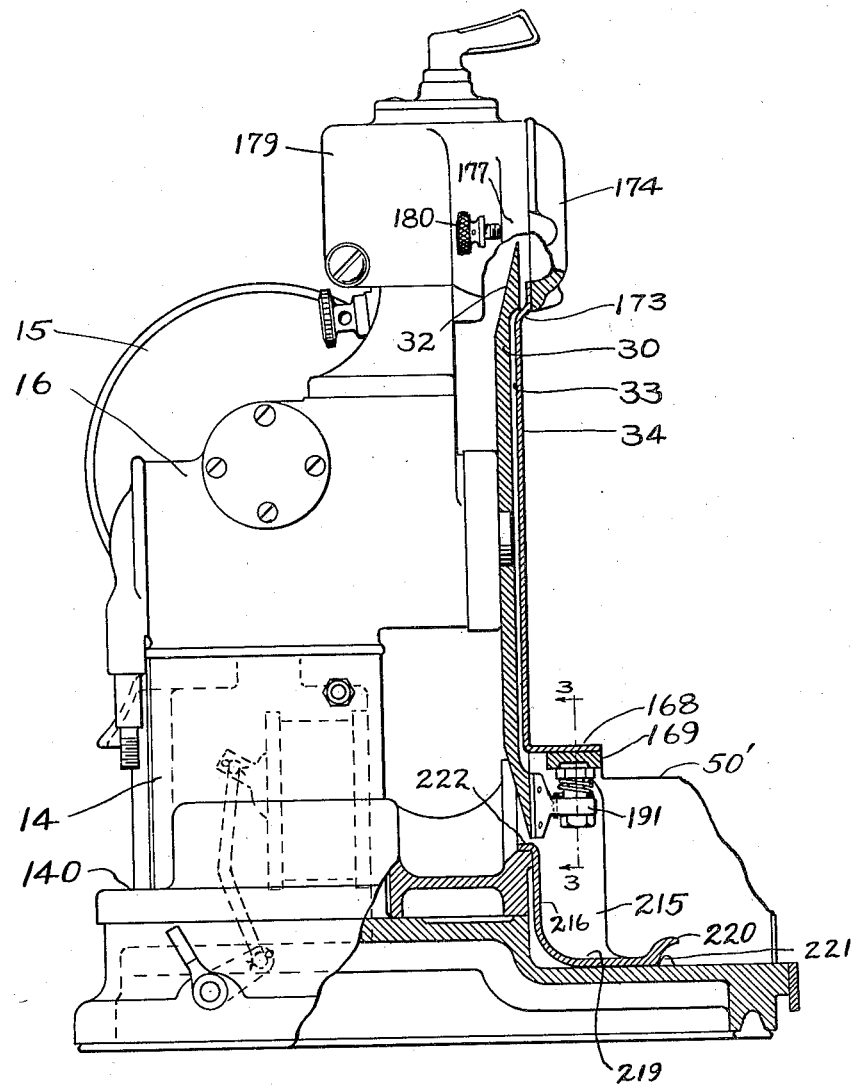
Fig. 2 is a vertical sectional view taken on the plane of the line 2—2 of Fig. 1.

Referring to the drawings, in which is disclosed a preferred embodiment of the invention, the numeral 10 indicates the base of the machine which is illustrated as a casting, generally rectangular in shape. The base 10 carries a raised portion or upwardly extending rectangular extending portion 14 upon which is mounted an electric motor 15 and gear housing 16 carrying shafting and gearing for rotatably supporting and driving a rotary disk knife 30. Mounted on the base on the rear side of the knife 30 is a slice receiving tray 140; and adjustably mounted on the base at the side of the knife is a gage plate 98 for regulating the thickness of the slices being cut. A suitable meat supporting carriage is mounted on suitable tracks for reciprocation back and forth across the front side of the knife; but as these parts form no part of the invention claimed herein, they are not shown.

The knife is of the usual circular disk type with a beveled portion 32 on the rear face forming a peripheral cutting edge, and has a circular recess 33 in the front face thereof to receive the guard plate 34. The outer surface of the guard plate 34 preferably lies in a vertical plane slightly back of the vertical plane of the cutting edge of the knife. This guard is generally circular in shape as shown in Fig. 1, but is provided at the lower portion thereof with an outwardly extending flange 168 seating upon a bracket 169 which bridges across from, and is fastened to, the upper surface of the box 50' and the upstanding flange 100 by screws 172. The upper portion of the guard plate 34 is provided with an offset flange 173 which is fastened by screws 173' to a cooperating portion of a cover plate 174, which is in turn provided with outwardly extending lugs 175 and 176 which respectively cooperate with outwardly extending lugs 177 and 178 formed on a grinder casing 179 seating on top of the housing 16. Thumb screws 180 and 181 pass through openings in the lugs 177 and 178 and thread within a bore within the rear surfaces of the lugs 175 and 176 to removably fasten the cover 174 to grinder casing 179. The bracket 169 is provided with spaced openings 170 and 170' through which pass threaded dowel pins 171 and 171' respectively, the pins having upper hexagonal flanges or integral collars 182 and are fastened in place by locking nuts 182' threaded on the dowel pins beneath the bracket, the collars 182 engaging cooperating shoulders 169' formed on the bracket to prevent the dowels from turning as the nuts 182' are tightened to rigidly fasten the dowels in position. The upper ends of the dowel pins are tapered to receive spaced openings 167 and 167' formed through the flange 168 to properly position the guard plate 34 with reference to the front face of the knife 30. The guard plate 34 is thus rigidly fastened at spaced points at its upper end to a fixed part of the machine; and the dowels 171 and 171' may be adjusted with reference to the bracket 169 by loosening the lock nuts 182' to permit horizontal shifting of the pins within the openings 170 and 170' which are of substantially larger diameter than the exterior diameter of the pins, the lock nuts 182' being then retightened to hold the pins in adjusted position. The arrangement is such that a rigid support is also provided at spaced points at the lower end of the guard plate, so that when the thumb screws 180 and 181 are tightened to clamp the cover 174 in position, the guard is rigidly and securely clamped in position and properly centered within the recess 33 of the front face of the knife 30 but out of contact with the knife; while ready removability of the guard plate is afforded merely by the removal of the thumb screws 180 and 181.

The edge of the knife opposite to that at which the slicing is performed is provided with an arcuate channel-shaped guard member 183 which is formed at its upper end with an outwardly extending lug 184 having an opening through which passes the thumb screw 181 to hold this end of the guard in fixed position, and is provided at its lower end with an outwardly extending lug 185 having an opening through which passes a thumb screw 186 threading within a bore formed in an upwardly extending lug 187 of the bracket 169.

Threaded into the under side of bracket 169 is a bolt 190 on which is pivotally mounted a bearing lug 191 formed integral with an outwardly extending arm 192 to which is fastened at its outer end a scraping blade 194, which is adapted to bear against the peripheral plane surface of the forward side of the knife to maintain the same properly cleaned. The scraper blade 194 is yieldingly urged into engagement with the knife edge by means of a coil spring 195, one end of which is fastened to the bracket 169 and the other end of which is attached to the arm 192 as indicated at 196 in a manner to act resiliently against this pivoted arm.

Positioned beneath the knife is a crumb pan 215. This pan is provided with a rear wall 216, side walls 217 and 218, and a bottom 219, the front of the pan being open. A handle 220 is attached to the bottom wall 219. A stop or bead 221 (of which two are shown, one at each side of the scrap pan) normally retains the scrap pan in position, but the handle permits of lifting the pan over the beads so that it may be removed sideways (away from the plane of the knife) from between the box 50' and flange 100 at the front side of the machine. The rear wall 216 of the scrap pan is provided with a flange portion 222 formed to approximate the curvature of the knife and to closely approach the knife to thus effectively receive scraps, or the like, from the knife face. It also acts, when in position, as a guard for the knife edge. As shown this flange 222 is extended beneath the knife and curved to conform with its edge and is also, preferably, inclined downwardly toward the pan to assist in directing material into the scrap pan.

The scraper 194 is thus mounted in a protected position beneath the bracket 169 which bridges the gap between the upstanding spaced projections 50' and 100 on the base, the scraper being at the same time readily accessible for cleaning or removal. The upstanding projections form guides or slides for the reception of the removable crumb scrap pan 215 which is positioned beneath the bracket 169 and the scraper 194. The projections 50' and 100 extend upwardly to a height such that the bracket 169 extends across the front face of the knife above the lower edge thereof, so that the scraper mounted beneath the bracket on the downwardly depending pivot pin is brought into proper position for effective scraping action of the peripheral edge of the front face of the knife. The bracket 169 forming a mounting for the scraper also provides a mounting for securing the lower portion of the front guard plate 34 in position, and also the lower portion of the annular guard 183. An economical compact arrangement and mounting of the parts is thereby provided, while at the same time these parts and their securing means are rendered accessible for easy removal.

Referring more particularly to Figs. 4 to 9, a somewhat modified form of scraper mechanism for the face of the knife is illustrated. In this form, a bracket 169' bridges across the front face of the knife 30' between the projections 50' and 100', and forms a support for the lower portion of the front guard 34' and the annular guard 183' in the manner previously described. Intermediate the ends of the bracket, a threaded bore 315 is provided adapted for the attachment of the scraper for the edge of the front face of the knife. The lower portion of the bracket about the bore 315 is provided with a flat face 316 against which portions of the scraper mechanism abut. Extending inwardly from the lower face 316 are four diametrically opposed sockets 318 arranged concentrically about the bore 315.

Abutting against the lower face 316 is a retainer cap 320 having a bore 321 in its head or cap portion 322 positioned in alignment with the bore 315, and receiving the stem portion 336 of a pivot pin 335 having a reduced threaded end 337 fastened in the bore 315. The cap 322 is also provided with a small opening 323 adapted to be positioned in alignment with one of the sockets 318. The lower edge 324 of the open ended retainer cap 320 is rotatably received within a peripheral groove 325 formed on the upper face of a scraper arm 326, which as shown is constructed as a casting having a body portion of cylindrical form through which a bore 327 extends, this bore loosely receiving the stem portion 336 of the pivot pin. The upper flat face 328 of the body portion within the peripheral flange 325 is provided with a small hole or socket 329 adapted to receive one end 330 of a coil spring 331 positioned about the pivot pin and enclosed by the retainer cap 320 so as to be protected against the ingress of water, meat particles and the like. The other end 332 of the spring passes through the opening 323 in the cap 320 and is adapted to be inserted in one of the sockets 318 in the body of the supporting bracket 169'.

In assembling, the end 330 of the spring 331 is first secured in place in the hole 329 of the scraper arm 326. The cap 320 is then pressed over this spring so that the end 332 of the spring passes through the hole 323. The cap with spring attached is then turned and the projecting end 332 of the spring enters into the appropriate socket 318 to provide the proper spring tension on the scraper assembly. The stud 335 is then inserted upwardly from beneath the scraper arm 326 through the aligned bores. The shoulder 338 formed on the stud is adapted to contact with the bottom of the bracket 169' as the stud is threadedly tightened in position. The length of the cylindrical portion 336 of the stud is slightly greater than the combined lengths of the retainer cap 320 and the cylindrical portion 326 of the scraper arm, so that the scraper arm is thus provided with a free pivotal mounting on an axis which is spaced from but is generally parallel to the plane of rotation of the knife. The scraper arm is thus free to swing beneath the bracket toward and away from the knife, and is spring pressed toward the knife by the spring 331. The tension of the spring can be readily adjusted by loosening the pin 335 so as to permit the scraper assembly to be lowered to withdraw the end 332 of the spring 331 from one of the sockets 318, grasping the retainer cap 320 between the fingers and turning the same, to bring the end 332 into alignment with another socket, raising the assembly to cause the insertion of this spring end into another of the sockets to provide the desired spring tension, and then tightening the pin 335 to clamp the assembly in place. For this purpose, it is noted that the retainer cap is mounted for free rotation relative to the bracket 169' and also relative to the scraper arm 326, the interconnection between the retainer cap and the spring being provided by the passage of the end of the spring through the opening 323 in the cap. The construction is such that the spring is enclosed and protected against injury and the entry of meat juices and scraps, while at the same time easy adjustment of the tension of the scraper is afforded.

The scraper arm 326 is provided with an integral extension 340 which extends horizontally from the cylindrical body portion, and the end of this extension terminates in a substantially cylindrical integral portion 341 having a flat forward face 342. Projecting outwardly from this forward face 342 is a pivot pin or stud 343 which may also be formed integrally with the scraper arm. The pivot pin 343 is provided with a longitudinally extending threaded bore 344. Pivotally mounted on the pin 343 is a scraper edge retainer 345, which may also be formed as a metal casting as shown. This member is provided with a cylindrical portion 346 having a bore 347 extending therethrough adapted to be received loosely upon the pin 343. This scraper edge retainer is held in place by a screw 348 having a threaded end which is threadedly received within the bore 344, a suitable washer 348' being positioned between the head of the screw and the end of the stud 343 to overlie the plane surfaced end of the cylindrical portion 346 of the scraper edge retainer to hold the same in place. The length of the cylindrical portion 346 of the retainer 345 is somewhat less than the length of the stem of the pin 343, so that the screw and washer bear rigidly against the end of the pin 343, leaving a free pivotal mounting on this member for the scraper edge retainer 345. This provides a pivotal axis for relative movement of the scraper edge retainer with respect to the scraper arm 326 which is arranged at substantially right angles to the pivotal axis of the scraper arm.

The member 345 is also provided with an integral extending flattened portion 350 adapted to extend adjacent the face of the knife 30' at an angle thereto. The knife-ward portion of this extension 350 is provided with a flat groove 352 having a rear shoulder 353, and a flat scraper blade 354 is attached thereto as by means of rivets 355. The scraper blade is preferably formed of a fibrous composition, and may be a rather rigid blade having a thickness of about $\tfrac{1}{16}$ of an inch. The forward scraping edge 356 of the blade is shown as beveled at an angle of approximately 30°. The construction described provides a substantially noiseless scraping blade which is held in effective scraping engagement with the front face of the knife under a yielding force, while at the same time being free to rock or tilt relative to the scraper arm in response to irregularities in the face of the knife, or to any irregularities of rotation of this face due to slight eccentricity or the like. The spring tension on the scraper arm tends to hold the scraper blade and retainer in such position that the scraping edge of the blade is maintained flush with the face of the knife. However, should the scraping edge encounter irregularities, it is free to rock or tilt relative to the scraper arm to automatically accommodate itself to such irregularities without imposing any undue strain on the parts. The scraper blade 354 is preferably formed from a fibrous composition impregnated with a greaseproofing material, such as a resinous fibrous composition, so that the blade is resistant to grease and will not become saturated with meat juices and softened during use. A comparatively thick rigid fibrous blade is used in order to avoid objections inherent in exceedingly thin blades whose edges tend to soften and flow somewhat due to heat and friction resulting from contact with the rapidly rotating surface of the knife.

In order to retain the scraper retainer 345 and the scraper blade 354 in proper relationship with respect to the knife, as these parts are rocked away from the knife upon rotation of the arm 326 against the action of the spring as for cleaning and the like, the free pivotal movement of the scraper edge retainer 345 about the pin 343 is limited. As shown, an upstanding pin 358 extends from one side of the projection or stud 343, and this pin is received within a cooperating socket 359 formed on the adjacent face of the cylindrical portion 346 of the scraper edge retainer 345. As shown, the annular wall of the cylindrical portion 346 is cut away over an angular range of about 35 to 40 degrees so as to receive the pin 358. Consequently the scraper edge retainer is free to pivot about the stud 343 only to the extent of the angular range permitted by the socket portion 359. The result is that the beveled edge 356 of the scraper blade is at all times maintained facing toward the rotary knife, so that when the scraper assembly is released and consequently swung back toward the knife due to the action of the spring 331, the scraper edge retainer and scraper blade will be automatically returned into proper scraping engagement with the knife face.

While the forms of apparatus herein described constitute preferred embodiments of the inven-

What is claimed is:

1. In a slicing machine, a base, a rotary knife having a recessed front face mounted on said base, a bracket supported on said base and extending across the front face of said knife at the lower portion thereof above the plane of the lower cutting edge, a guard for the front face of said knife positioned within the recessed portion of the knife, said guard having an outwardly extending flange mounted on said bracket, and a scraper for the edge of the front face of said knife mounted beneath said bracket.

2. In a slicing machine, a base having spaced upward projections, a rotary slicing knife mounted on said base, a bracket bridging and supported on said projections extending across the front face of said knife, a scraper for the front face of said knife carried by said bracket, and a scrap pan slidably positioned between said projections beneath said bracket and scraper for removal sideways at the front side of said machine.

3. In a slicing machine, a base, a rotary knife mounted thereon, spaced upward projections carried by said base, a bracket bridging and supported on said projections extending across the front face of said knife above the lower edge of the knife, and a scraper mounted on the said bracket on the under side thereof in scraping relation with the edge of the front face of the knife.

4. In a slicing machine, a base having spaced upward projections, a rotary generally vertical slicing knife mounted on said base, a bracket bridging and supported on said projections extending across the front face of said knife above the lower edge thereof, a pivot pin depending downwardly from the under side of said bracket, a scraper for the front face of said knife pivotally mounted on said pin to swing toward and away from the face of the knife, and spring means for urging said scraper into position adjacent the knife face.

5. In a slicing machine having a rotary knife, a scraper for the face of said knife comprising a scraper arm pivotally mounted about an axis for swinging movement toward and away from the said knife face, spring means for urging said scraper arm toward the knife face, a scraper blade member pivotally connected to said arm about an axis arranged at an angle to the first mentioned axis so that the scraper blade member is mounted to rock relatively to the scraper arm in response to irregularities of the knife face during rotation thereof, and means to limit the rocking movement of the scraper member relative to the arm when the arm is swung about its axis to remove the scraper blade member from the face of the knife, whereby the scraper blade member will automatically return to proper scraping position with reference to the knife face as the arm and scraper blade member are swung back toward the knife.

6. In a slicing machine having a rotary disk knife, a supporting bracket mounted across the face of said knife, a pivot pin carried by the bracket and providing an axis spaced laterally from but generally parallel to the plane of rotation of the knife, a scraper arm pivotally mounted on said pin to swing toward or away from the knife face, a scraper blade retainer pivotally mounted on said arm about an axis arranged at an angle to the first mentioned axis so that the scraper blade retainer is free to rock relatively to the arm in response to irregularities of the knife face during rotation thereof, a substantially rigid fiber scraping blade fixedly carried by said retainer so as to normally rest at an angle to the knife face with the scraping edge of the blade in contact with the knife face, and spring means for urging said arm toward the knife to yieldingly press said scraper blade against the knife face.

7. In a slicing machine having a generally vertical rotary disk knife, a generally horizontal supporting bracket mounted across the face of said knife above the lower edge thereof, a pivot pin depending downwardly from the under side of said bracket and providing an axis spaced laterally from but generally parallel to the plane of rotation of the knife, a scraper arm pivotally mounted on said pin to swing toward and away from the knife face, a scraper blade retainer pivotally mounted on said arm about an axis arranged at substantially right angles to the first mentioned axis so that the scraper blade retainer is free to rock relatively to the arm in response to irregularities of the knife face during rotation thereof, a scraper blade carried by said retainer so as to normally rest at an angle to the knife face with the scraping edge of the blade in contact therewith, and means to limit the extent of rocking movement of the scraper blade retainer and scraper blade relative to the scraper arm.

8. In a slicing machine having a rotary knife, a supporting member, a scraper for the face of said knife having a substantially non-yielding scraper arm, a pivotal mounting for said scraper arm on said supporting member arranged to provide for swinging movement of said scraper toward or away from the face of the knife, a spring positioned about said pivotal mounting, one end of said spring being attached to said scraper arm, said supporting member having a plurality of sockets therein arranged concentrically about said pivotal mounting, the other end of the spring being adapted to be received in one of said sockets, and means for turning said latter end of the spring to position the said end in one or another of said sockets to vary the tension of the spring and thereby vary the yielding force with which the scraper is held against the knife face.

9. In a slicing machine having a rotary knife, a supporting member, a scraper for the face of said knife, a pivotal mounting for said scraper on said supporting member arranged to provide for swinging movement of said scraper toward or away from the face of the knife, a spring positioned about said pivotal mounting, one end of said spring being attached to said scraper, said supporting member having a plurality of sockets therein arranged concentrically about said pivotal mounting, the other end of the spring being adapted to be received in one of said sockets, a cap member enclosing said spring rotatably mounted with respect to said supporting member and said scraper, said cap member having an opening receiving said pivotal mounting and another opening receiving the end of said spring which cooperates with the sockets in said supporting member, the construction being such that turning said cap member turns the said end of the spring for insertion into another socket to vary the tension of the spring.

10. In a slicing machine having a rotary disk knife, a supporting bracket extending across the face of said knife, a pivot pin carried by said bracket, a coil spring surrounding said pivot pin, an open ended cap member having a centrally arranged opening in the cap portion thereof loosely receiving said pivot pin and another opening in the cap portion through which one end of said coil spring extends, said bracket having a plurality of sockets concentrically arranged about said pivot pin to receive this extended end of the spring, and a scraper member rotatably mounted on said pivot pin and having an engaging surface for rotatably receiving the open end of said cap member to close the same and thereby enclose the spring, said scraper member being attached to the other end of the coil spring, whereby turning of the cap member relatively to the supporting bracket and the scraping member turns the extended end of the spring for insertion into another socket to vary the tension of the spring.

11. In a slicing machine having a generally vertical rotary disk knife, a generally horizontal supporting bracket mounted across the face of the knife above the lower edge thereof, a pivot pin depending downwardly from the under side of said bracket, a coil spring mounted about said pivot pin, a cap member positioned about said pivot pin and spring, a scraper arm pivotally mounted about said pivot pin for swinging movement toward and away from the face of said knife, said cap member and scraper arm enclosing said coil spring, a scraper blade retainer pivotally mounted on said scraper arm about a generally horizontal axis, a scraper blade carried by said scraper blade retainer having a scraping edge adapted to contact with the front face of said knife, means for connecting said spring to urge said scraper arm and scraper blade retainer with scraper carried thereby toward the face of said knife and for varying the tension in said spring, and means for interconnecting said spring and said cap member so that a simple turning of the cap member effects adjustment of the tension in said spring.

HERBERT L. JOHNSTON.